United States Patent [19]
Black et al.

[11] 3,930,288
[45] Jan. 6, 1976

[54] TOGGLE FOR USE WITH ROPE

[75] Inventors: Allan Black; Ralph Somerville, both of Vancouver, Canada

[73] Assignee: Poli-Twine Corporation Limited, Saskatoon, Canada

[22] Filed: June 18, 1974

[21] Appl. No.: 480,377

[30] Foreign Application Priority Data
Feb. 6, 1974 Canada .................... 191866

[52] U.S. Cl. .................................... 24/129 R
[51] Int. Cl.² .................................... F16G 11/14
[58] Field of Search ............. 24/129 R, 129 B, 18

[56] References Cited
UNITED STATES PATENTS

| | | | |
|---|---|---|---|
| 329,071 | 10/1885 | Palmer | 24/129 R |
| 551,836 | 12/1895 | Provan | 24/129 B |
| 987,407 | 3/1911 | Scott | 24/129 R |
| 1,407,406 | 2/1922 | Glazebrook | 24/129 R |
| 1,583,343 | 5/1926 | Duerden | 24/129 R |
| 1,896,705 | 2/1933 | Geisenhoner | 24/129 R |
| 2,547,469 | 4/1951 | Husson | 24/129 R |
| 3,160,979 | 12/1964 | Bissell | 24/129 R |

FOREIGN PATENTS OR APPLICATIONS

| | | | |
|---|---|---|---|
| 24,986 | 11/1902 | United Kingdom | 24/129 |
| 124,973 | 10/1931 | Austria | 24/129 R |

*Primary Examiner*—Bernard A. Gelak
*Attorney, Agent, or Firm*—Otto John Munz

[57] ABSTRACT

In the handling of bundled articles, for example, logs and timber, it has been known to use a large variety of knots and tethering devices with what are known in the logging industry as toggles. Prior known techniques and devices have caused excessive wear on ropes and have been time consuming in forming attachments, particularly in log booms. The present invention provides a one piece toggle having a plurality of rope receiving holes therein and contoured to permit rapid threading of ropes for cables and reducing wear on the ropes or cables to a minimum.

8 Claims, 5 Drawing Figures

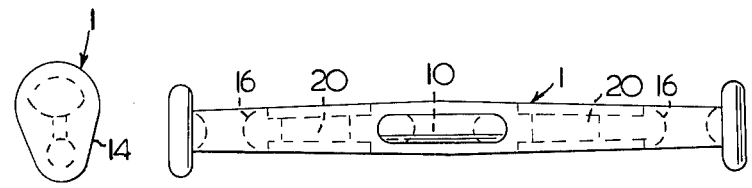
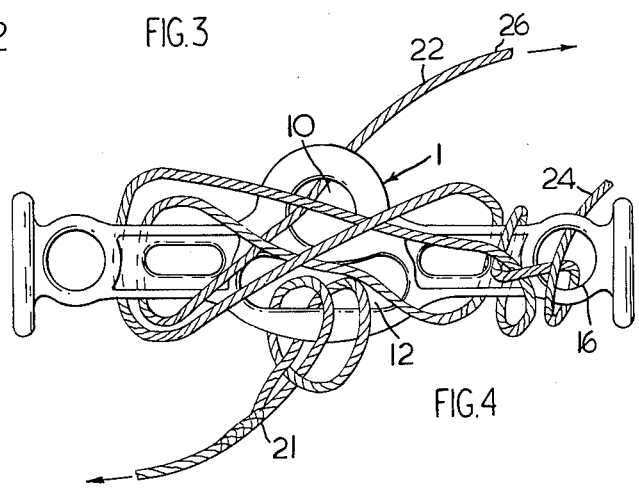
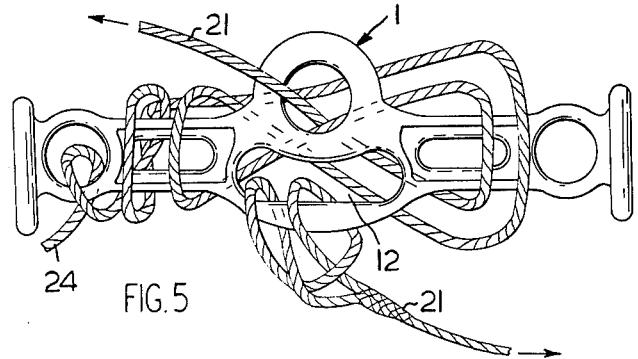
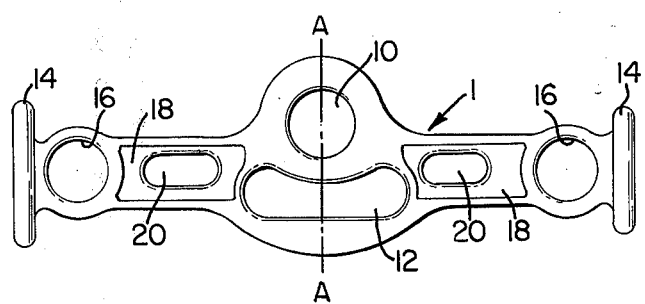

TOGGLE FOR USE WITH ROPE

This invention relates to toggles for use with ropes and cables. The toggle described has particular, but not exclusive utility in the logging industry.

Prior known toggles are exemplified by U.S. design Pat. Nos. 31,980 and 181,113 and U.S. Pat. Nos. 1,613,635, 1,713,901 and 3,238,585.

While the foregoing specifications cannot represent all known toggles, since individual toggles have been produced to suit particular applications by operators in the field, the present invention represents the first attempt at mass producing a toggle which has been developed to overcome all defects in prior known toggles and which has been shown to be surprisingly effective in the logging industry and in the short time in which to toggle has been used its acceptance has been widespread and its utility greatly enjoyed in the logging industry.

SUMMARY OF THE INVENTION

It is an object of one feature of the invention to provide a toggle which is suitable for use with a variety of knots or fastening arrangements.

It is a feature of another object of the invention to provide a toggle whose strength is high but whose weight is substantially low that the toggle can be supported on the surface of water by the buoyancy of the rope to which it is attached.

It is a feature of another object of the invention to provide a toggle which causes a minimum of wear of ropes connected thereto.

It is a feature of yet another object of the invention to provide a toggle which is suitable for mass production by casting, pressure die-casting or by forging.

In accordance with the foregoing features the toggle in its broadest aspect comprises an elongate body member, said body member being substantially symmetrical about a line of symmetry through the centre thereof, said body member having a first substantially circular hole disposed symmetrically about said line of symmetry and a second elongated hole also disposed symmetrically about said line of symmetry, the body member further including a pair of outer holes disposed adjacent the ends of the body.

A preferred embodiment of the invention will now be described with reference to the accompanying drawings.

BRIEF DESCRIPTION OF THE DRAWING

FIG. 1 is a side view of the toggle in accordance with the present invention;

FIGS. 2 and 3 are an end view and a plan view, respectively, of the toggle shown in FIG. 1; and FIGS. 4 and 5 are front and rear views of the toggle shown in FIG. 1 after being threaded with rope or twine.

DESCRIPTION OF THE PREFERRED EMBODIMENTS

Referring to FIGS. 1, 2 and 3, the toggle generally indicated at 1, comprises a substantially symmetrically elongate body. As will be observed, particularly from FIG. 1, the toggle is symmetrical about the vertical centre line AA. The body contains a first circular hole 10 symmetrical about the line AA and a second hole 12 also symmetrical about the line AA and the second hole is elongated in the lengthwise direction of the toggle by an amount sufficient to permit at least the passage of two ropes or twines therethrough.

At each end of the toggle there is provided a foot or flange 14 which, as shown in FIG. 2, may be oval or pear-shaped. The body 1 also includes a pair of holes 16 located near the extremities of the body.

It will be observed from the dotted lines, in FIG. 3, with particular reference to holes 10 and 16, that each of the holes are radiused to permit an easy threading of ropes and twines thereto and to inhibit unnecessary wear of the same.

It will be observed that the toggle is ribbed at 18 to reduce the weight thereof and the ribs thus formed may include lightening holes 20.

In FIGS. 4 and 5 there are shown front and rear views respectively, of the toggle with one illustrative form of rope attachment. For example, the elongated hole 12 receives two passes of the end of a rope 21 which is permanently spliced to the toggle.

A second rope 22 having an end 24 is passed through one hole 16 and secured about the body of the toggle by a number of hitches and passes which are followed by passage of the working end 26 of the rope 22 through hole 10. The hitches and passes used will be chosen by the logger or other user of the toggle to suit particular application.

In the appended drawings all the holes 10, 12 and 16 have substantially parallel axes. While holes 20 are mainly for lightening purposes these holes have axes which are substantially parallel to the aforesaid parallel axes. It will be appreciated that the axes of holes 10 and 12 need not necessarily be parallel to the axes of holes 16 and 20.

Since the ropes or twines in some instances, for example as shown in FIGS. 4 and 5, pass on the outside of the body of the toggle, all exterior surfaces of the toggle are free from sharp corners and are preferably formed with adequate radii to prevent abrasion or cutting of the ropes or twines to be used therewith.

The toggle discussed herein has been found suitable for attaching large log booms together wherein the boom might comprise one stiff leg, 180 bundle lines, 30 swifter lines and about 1400 feet of tow line. Such a boom may contain up to 192 bundles of logs and have a total length of 1800 feet. To those familiar with logging art it will be readily appreciated that the use of a single toggle of each of nearly 200 individual bundles and the attachments of all bundles together for towing purposes represents a considerable effort in making up to 300 or 400 attachments. The present invention, in providing an easily manipulated toggle throughout the boom, represents a considerable saving in time. The additional featured buoyancy provides an even greater saving in time since the loggers do not have to search around for toggles which have sunk beneath the surface of the water.

Other embodiments of the invention falling within the terms of the appended claims will appear to those skilled in the art.

The embodiments of the invention in which an exclusive property or privilege is claimed are defined and claimed as follows:

1. A toggle for use in association with rope or twine for the handling of bundled articles or logs, said toggle comprising an elongate body member, said body member being substantially symmetrical about a transverse line of symmetry through the centre thereof, said body member having a first substantially circular hole disposed symmetrically about said line of symmetry and a second hole elongated in shape, also disposed symmetrically about said line of symmetry, the body member further including a pair of outer holes disposed adjacent the ends of the body the ends of said body being terminated by a T-shaped portion.

2. A toggle as in claim 1 wherein each portion of said elongate body member disposed on one side of said line of symmetry includes a web portion.

3. A toggle as in claim 2 wherein each web portion includes a lightening hole.

4. A toggle as in claim 1, wherein the axes of said circular, elongated and outer holes are substantially parallel.

5. A toggle according to claims 1, wherein each of said circular elongated and outer holes are provided with chamfers or radii to inhibit wear on a rope received therein.

6. A toggle according to claims 1, further comprising associated rope, the weight of the toggle being less than the net upward buoyancy thrust of the associated rope.

7. An elongated toggle substantially symmetrical about a transverse axis for use in association with a rope for handling of bundled articles such as logs, comprising:
  a first substantially circular hole and
  a second hole elongated in shape;
  both said holes disposed symmetrically about the central axis through the width therof;
  a pair of outer holes disposed adjacent the ends of said toggle;
  the said ends terminated by T-shaped portions;
  the axes of the said circular and the said elongated holes being substantially parallel to each other;
  the axes of said outer holes being parallel to each other;
  all said holes having diameters permitting easy threading of ropes therethrough.

8. An elongated toggle as claimed in claim 7, further comprising:
  associated ropes operatively attached to the toggle and
  means to make said toggle buoyant to prevent its sinking beneath the surface of the water.

* * * * *